(12) United States Patent
Naneix

(10) Patent No.: US 12,322,973 B2
(45) Date of Patent: Jun. 3, 2025

(54) ELECTRICAL ARCHITECTURE FOR AN AIRCRAFT

(71) Applicant: SAFRAN ELECTRICAL & POWER, Blagnac (FR)

(72) Inventor: Philippe Naneix, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 18/576,725

(22) PCT Filed: Jun. 21, 2022

(86) PCT No.: PCT/FR2022/051202
§ 371 (c)(1),
(2) Date: Jan. 4, 2024

(87) PCT Pub. No.: WO2023/281179
PCT Pub. Date: Jan. 12, 2023

(65) Prior Publication Data
US 2024/0291280 A1 Aug. 29, 2024

(30) Foreign Application Priority Data
Jul. 8, 2021 (FR) ........................... 2107430

(51) Int. Cl.
*H02J 3/38* (2006.01)
*H02J 3/42* (2006.01)
*H02M 7/797* (2006.01)

(52) U.S. Cl.
CPC ............... *H02J 3/381* (2013.01); *H02J 3/42* (2013.01); *H02M 7/797* (2013.01); *H02J 2310/44* (2020.01)

(58) Field of Classification Search
CPC .......... H02J 3/381; H02J 3/42; H02J 2310/44; H02M 7/797
(Continued)

(56) References Cited

U.S. PATENT DOCUMENTS 5,422,518 A * 6/1995 Sashida ..................... H02J 3/38
307/75
6,806,589 B1 10/2004 Suttie
(Continued)

FOREIGN PATENT DOCUMENTS

EP 0570976 A2 11/1993
EP 1921741 A2 5/2008
(Continued)

OTHER PUBLICATIONS

Rahrovi Babak et al., "A Review of the More Electric Aircraft Power Electronics", 2019 IEEE Texas Power and Energy Conference (TPEC), IEEE, Feb. 7, 2019 (Feb. 7, 2019), 6 pages.
(Continued)

*Primary Examiner* — Hal Kaplan
(74) *Attorney, Agent, or Firm* — Cozen O'Connor

(57) ABSTRACT

An electrical architecture for an aircraft includes a first propulsion power distribution system distributing a high DC voltage, a second propulsion power distribution system distributing a high DC voltage, a first AC power distribution system distributing a three-phase AC voltage, a second AC power distribution system distributing a three-phase AC voltage, a first inverter connected between the first propulsion power distribution system and the first AC power distribution system, a second inverter connected between the second propulsion power distribution system and the second AC power distribution system, and an electronics module connected to the first inverter and to the second inverter in order to control the frequency of the three-phase AC voltage (Continued)

generated by the first inverter and the frequency of the three-phase AC voltage generated by the second inverter.

10 Claims, 1 Drawing Sheet

(58) Field of Classification Search
USPC .......................................................... 307/82
See application file for complete search history.

(56) References Cited

U.S. PATENT DOCUMENTS

| | | | |
|---|---|---|---|
| 7,612,514 B2* | 11/2009 | Anghel | H02J 4/00 |
| | | | 318/440 |
| 11,671,025 B2* | 6/2023 | Tariq | H02M 3/3376 |
| | | | 363/15 |
| 2012/0025604 A1 | 2/2012 | Baumann et al. | |
| 2018/0216526 A1 | 8/2018 | Dalal et al. | |
| 2020/0389127 A1 | 12/2020 | Huang | |
| 2022/0411082 A1 | 12/2022 | Delbosc et al. | |

FOREIGN PATENT DOCUMENTS

| | | |
|---|---|---|
| EP | 3790140 A1 | 3/2021 |
| WO | WO 2021099720 A1 | 5/2021 |

OTHER PUBLICATIONS

Barzkar Ashkan et al., "Electric Power Systems in More and All Electric Aircraft: A Review", IEEE Access, IEEE, USA, vol. 8, Sep. 15, 2020, pp. 169314-169332.

International Patent Application PCT/FR2022/051202 International Search Report dated Aug. 8, 2022 with English translation, 7 pages.

* cited by examiner

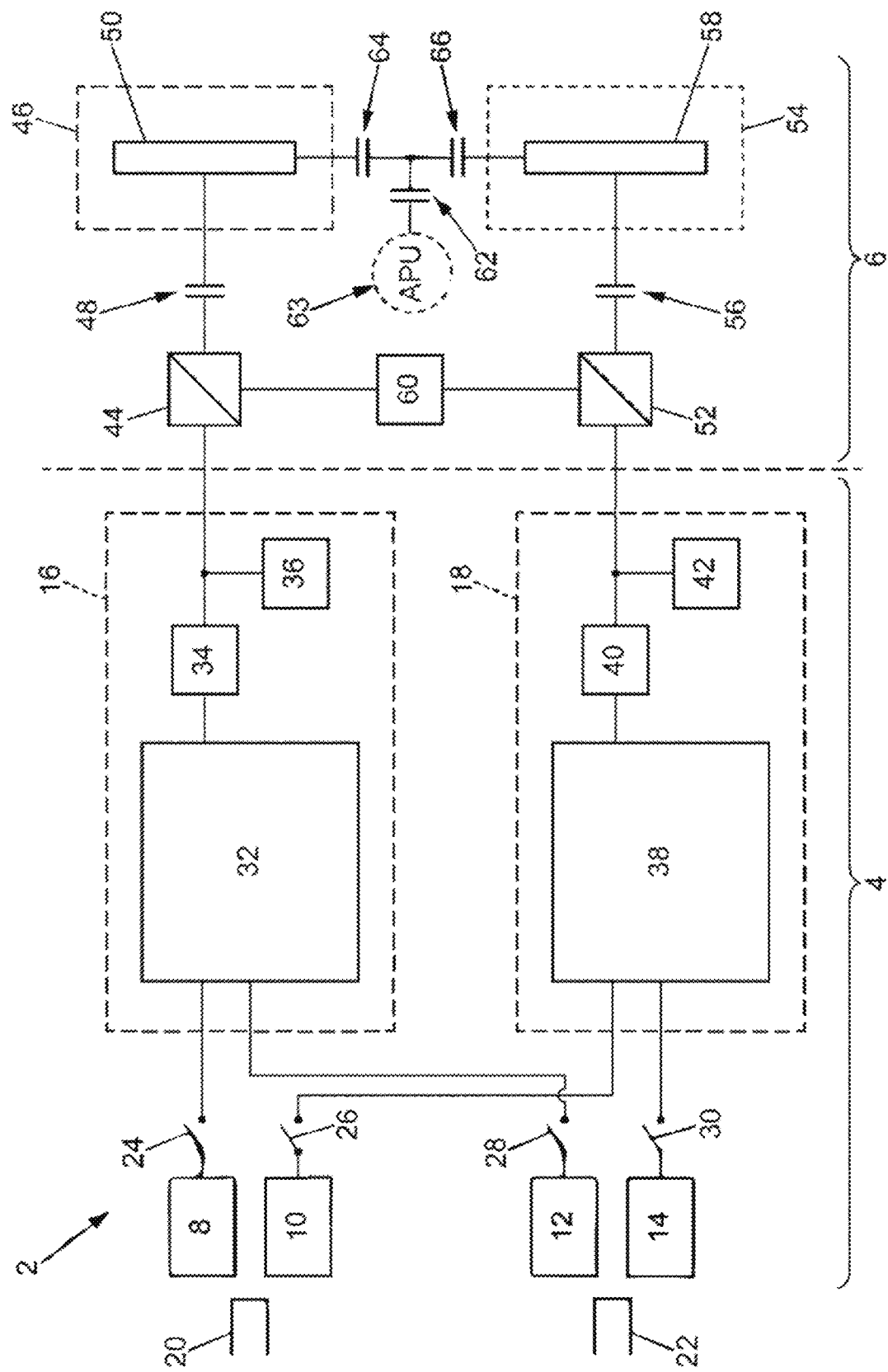

ELECTRICAL ARCHITECTURE FOR AN AIRCRAFT

CROSS-REFERENCE TO RELATED APPLICATIONS

This application is a US National phase Application of PCT/FR2022/051202 filed Jun. 21, 2022, which claims priority to French Patent Application No. 2107430 filed Jul. 8, 2021, both of which are hereby incorporated in their entirety.

TECHNICAL FIELD OF THE INVENTION

This invention relates to an electrical architecture for an aircraft.

BACKGROUND

Traditionally, aircraft comprise several high-voltage DC (direct current) power distribution systems and several AC (alternating current) power distribution systems. High-voltage DC power distribution systems are suitable for powering the equipment and loads related to propulsion. These systems are called "propulsion power distribution systems". They have a direct voltage of between 400 Volts and 800 Volts. Three-phase AC power distribution systems are suitable for powering passenger service equipment such as amenities, lighting fixtures, entertainment systems, and galleys. Three-phase AC power distribution systems can have a voltage of 115 Volts or 230 Volts. Each three-phase AC power distribution system is powered by an independent AC generator. Each AC generator is sized so that, in the event of a generator of another system breaking down, it can take charge of at least some of the loads of the other system. Switches connected between systems and between generators make it possible for one system to be supplied by a generator from another system.

However, as the AC generators are driven directly by the turbomachines via power transmissions, the frequency of the AC voltage generated by each generator is a function of the speed of the turbomachine. Consequently, the various generators which constitute the AC voltage sources are at completely different frequencies and phases. To avoid a short circuit generated by these phase and frequency differences, the power supply is cut off for a period of 20 to 30 milliseconds when connecting a generator to a second AC system. This cutoff leads to voltage sags of 100 to 200 ms which all equipment powered by the second AC system must undergo. The equipment is designed to accept these voltage sags using strategies which either store energy or restart as quickly as possible in order to disrupt the operation of the aircraft as little as possible, because reconfigurations of the electrical system may occur on the ground but also in flight.

SUMMARY

A first aim of this invention is to propose an electrical system architecture which makes it possible to avoid these voltage sags.

A second aim of this invention is to propose an electrical system architecture that is optimized from a weight, cost, and efficiency point of view.

This invention relates to an electrical architecture for an aircraft, comprising:
 a first propulsion power distribution system adapted to distribute a high DC (direct current) voltage, the first propulsion power distribution system comprising at least a first power distribution unit,
 a second propulsion power distribution system adapted to distribute a high DC voltage, the second propulsion power distribution system comprising at least a second power distribution unit,
 a first AC (alternating current) power distribution system adapted to distribute a three-phase AC voltage,
 a second AC power distribution system adapted to distribute a three-phase AC voltage,
 a first inverter connected between the first propulsion power distribution system and the first AC power distribution system,
 a second inverter connected between the second propulsion power distribution system and the second AC power distribution system,
 an electronics module connected to the first inverter and to the second inverter in order to control the frequency of the three-phase AC voltage generated by the first inverter and the frequency of the three-phase AC voltage generated by the second inverter.

Advantageously, the electronics module can easily control an inverter so as to synchronize the frequency of the first AC power distribution system and second AC distribution system. Consequently, in the event of a connection failure of the second propulsion system, the second AC system can be directly connected to the first propulsion system without having to wait for the electronic components of the second AC system to discharge. Similarly, in the event of failure of the first propulsion system, the first AC system can be directly connected to the second propulsion system. There is thus no longer any voltage sag in the AC systems.

Advantageously, the first propulsion system and the first AC system balance each other and operate at an operating point that is optimized for losses. In the same manner, the second propulsion system and the second AC system operate at an operating point that is optimized for losses.

The features set forth in the following paragraphs may optionally be implemented. They may be implemented independently of one another or in combination with one another:

The electronics module is adapted to link the phase of the AC voltage generated by the second inverter to the phase of the AC voltage generated by the first inverter.
 The electronics module is adapted to link the synchronization signals for the AC voltage generated by the second inverter to the synchronization signals for the AC voltage generated by the first inverter.
 The first inverter and second inverter are controlled to generate a three-phase AC voltage that is output at a frequency of 400 Hertz.

Advantageously, the fixed frequency of 400 Hertz makes it possible to accurately size all loads having magnetic components (motors, pumps, voltage transformer, etc.) which no longer have to take into account the low frequency of 350 Hertz. This results in a weight savings of around 10% for voltage transformers. Advantageously, the motors and pumps can be sized for an operating point at 400 Hertz. They can thus operate at their optimal operating efficiency.

At least one inverter among the first inverter and second inverter is a reversible inverter.

Advantageously, the reversibility of the first inverter and/or the second inverter makes it possible to supply electric power to the first and/or second propulsion power distribution system, for example by using an auxiliary power unit. This electric power may be stored in batteries or may supply power to the power distribution unit of the propulsion power distribution systems. This electric power may also be transmitted to electric machines operating in motoring mode.

The architecture comprises:

a first switch adapted to connect the first propulsion power distribution system to the first AC power distribution system;

a second switch adapted to connect the second propulsion power distribution system to the second AC power distribution system;

at least a third switch adapted to connect the first AC power distribution system to the second AC power distribution system.

Advantageously, these switches make it possible to connect the first AC power distribution system to the second propulsion power distribution system in the event of a breakdown of the first propulsion power distribution system. Similarly, these switches make it possible to connect the second AC power distribution system to the first propulsion power distribution system in the event of a breakdown of the second propulsion power distribution system.

The architecture comprises a junction box adapted to be connected to an auxiliary power unit, said junction box being connected between the first AC power distribution system and the second AC power distribution system.

The first propulsion power distribution system further comprises a first battery connected to the first inverter.

Advantageously, the electric power stored in the first propulsion power distribution system can be used by the first and possibly by the second AC power distribution system if so needed.

The architecture comprises:

a turbomachine having a low-pressure shaft and a high-pressure shaft, a first low-pressure electric machine coupled to the low-pressure shaft of the turbomachine, and a first high-pressure electric machine coupled to the high-pressure shaft of the turbomachine, the first low-pressure electric machine and the first high-pressure electric machine being connected to the first power distribution unit.

Advantageously, the first power distribution unit is powered by both an electric machine coupled to the low-pressure shaft and an electric machine coupled to the high-pressure shaft. This cross-connection provides greater redundancy and greater fault tolerance.

The architecture further comprises a second low-pressure electric machine coupled to the low-pressure shaft of the turbomachine and a second high-pressure electric machine coupled to the high-pressure shaft of the turbomachine, the second low-pressure electric machine and the second high-pressure electric machine being connected to the second power distribution unit.

At least one low-pressure electric machine and at least one high-pressure electric machine are reversible electric motors.

Advantageously, the electric motors can operate in generating mode to power the first power distribution system or in motoring mode to provide torque to the turbomachine.

BRIEF DESCRIPTION OF FIGURES

FIG. 1 is a schematic view of an electrical architecture for an aircraft, according to the invention.

DETAILED DESCRIPTION OF THE INVENTION

With reference to FIG. 1, electrical architecture 2 of this invention comprises a propulsion portion 4 and a non-propulsion portion 6.

The electrical architecture comprises, in propulsion portion 4, first 8 and second 10 electric machines coupled to a shaft 20 of a turbomachine, first 12 and second 14 electric machines coupled to a high-pressure shaft 22 of the turbomachine, a first propulsion power distribution system 16, and a second propulsion power distribution system 18.

For simplification, first propulsion power distribution system 16 and second propulsion power distribution system 18 are hereinafter respectively referred to as first propulsion system 16 and second propulsion system 18.

By convention, first 8 and second 10 electric machines coupled to low-pressure shaft 20 are hereinafter referred to as "low-pressure electric machines". Similarly, first 12 and second 14 electric machines coupled to high-pressure shaft 22 are hereinafter referred to as "low-pressure electric machines".

Low-pressure electric machines 8, 10 and high-pressure electric machines 12,14 are composed of electric motors. They operate in generating mode. They generate an AC which is rectified by rectifiers (not shown) to form a high DC voltage, generally between 400 Volts and 800 Volts. This high DC voltage powers first propulsion system 16 and second propulsion system 18.

Preferably, low-pressure electric machines 8,10 and high-pressure electric machines 12, 14 are composed of reversible electric motors. They can thus operate in motoring mode to assist the turbomachine during particular phases of flight.

In the embodiment shown, first low-pressure electric machine 8 is connected to first propulsion system 16 by means of a switch 24. Second low-pressure electric machine 10 is connected to second propulsion system 18 by means of a switch 26.

In the same manner, first high-pressure electric machine 12 is connected to first propulsion system 16 by means of a switch 28. Second high-pressure electric machine 14 is connected to second propulsion system 18 by means of a switch 30. Advantageously, this cross-connection with switches ensures greater fault tolerance. Indeed, in the event of failure of one of the two power-extraction shafts, the alternative systems described below continue to be supplied by the other power-extraction shaft.

Advantageously in the present patent application, two electric machines are installed on each mechanical power-extraction shaft of the turbomachine to ensure redundancy and fault tolerance.

First propulsion system 16 comprises a first power distribution unit 32, a busbar 34 connected to the output of first power distribution unit 32, and a first battery 36 connected to the output of busbar 34.

First power distribution unit 32 is adapted to power devices and loads necessary for propulsion of the aircraft, for example the engine computer and the engine deicing system.

Busbar 34 is adapted to power the connection devices.

In the same manner, second propulsion system 18 comprises a second power distribution unit 38, a busbar 40 connected to the output of the second power distribution unit, and a second battery 42 connected to the output of busbar 40. Electrical architecture 2 comprises, in its non-propulsion portion 6, a first inverter 44, a first AC power distribution system 46 connected to the first inverter, a second inverter 52, and a second AC power distribution system 54 connected to the second inverter.

First inverter 44 is connected to first propulsion system 16. It receives as input a high DC voltage from first propulsion system 16. It is adapted to convert this high DC voltage into a three-phase AC voltage having a voltage of 115 Volts or 230 Volts. In the same manner, second inverter 52 is connected to second propulsion system 18. It receives as input a high DC voltage from second propulsion system 18. It is adapted to convert this high DC voltage into a three-phase AC voltage having a voltage of 115 Volts or 230 Volts.

Preferably, first inverter 44 and second inverter 52 are reversible inverters. Advantageously, in the present electrical architecture, first propulsion system 16 and first AC system 46 balance each other and operate at an operating point that is optimized for losses. In the same manner, second propulsion system 18 and second AC system 54 operate at an operating point that is optimized for losses.

Electrical architecture 2 further comprises, in its non-propulsion portion 6, an electronics module 60 connected between the first inverter and the second inverter. Electronics module 60 is a control unit. In particular, it is adapted to control the frequency of the three-phase AC voltage generated by first inverter 44 and the frequency of the three-phase AC voltage generated by second inverter 52, so as to synchronize them.

Preferably, electronics module 60 is also adapted to link the phase of the AC voltage generated by second inverter 52 to the phase of the AC voltage generated by first inverter 44.

Electronics module 60 is also capable of linking the synchronization signals for the AC voltage generated by second inverter 52 to the synchronization signals for the AC voltage generated by first inverter 44.

Advantageously, the connections from first propulsion system 18 to second AC system 54 or from second AC system 18 to first AC system 46 can be carried out, due to this synchronization, without a voltage gap for the loads powered by the AC systems. Indeed, due to a frequency and phase synchronization, the first inverter and second inverter can be placed in parallel and thus ensure coverage during sequences of opening and closing the switches of first AC system 46 and of second AC system 54.

According to a first embodiment, electronics module 60 is adapted to link the frequency of the AC voltage generated by second inverter 52 to the frequency of the AC voltage generated by first inverter 44.

According to a second embodiment, first inverter 44 and second inverter 52 are controlled by electronics module 60 to generate as output a three-phase AC voltage at a frequency of 400 Hertz.

Advantageously, the fixed frequency of 400 Hertz makes it possible to size as accurately as possible all loads having magnetic components (motors, pumps, voltage transformer, etc.) which no longer have to take into account the low frequency of 350 Hertz. This results in a weight savings of around 10% for voltage transformers. Advantageously, the motors and pumps can be sized for an operating point at 400 Hertz. They can thus operate at their optimal operating efficiency.

First AC power distribution system 46 and second AC power distribution system 54 are hereinafter respectively referred to as first AC system 46 and second AC system 54. They each comprise at least one busbar 50, 58 which is adapted to power passenger service devices such as amenities, lighting, entertainment systems, and galleys. It partly corresponds to the on-board electrical system referred to as the "ATA24 system".

Electrical architecture 2 further comprises, in its non-propulsion portion 6, a junction box 62 intended to be connected to an auxiliary power unit 63 of the "APU" type. Junction box 62 is connected between first AC system 46 and second AC system 54. Auxiliary power unit 63 generates a three-phase AC voltage at fixed frequency which can be used on the ground to power AC systems 46, 54. Auxiliary power unit 63 is represented with dotted lines in FIG. 1.

Electrical architecture 2 further comprises, in its non-propulsion portion 6, a first switch 48 adapted to connect first propulsion power system 16 to first AC power system 46; a second switch 56 is adapted to connect second propulsion power system 18 to first AC power system 54.

In FIG. 1, first switch 48 is connected between first inverter 44 and first AC system 46. Alternatively, first switch 48 is connected between first inverter 44 and first propulsion system 16. In the same manner, second switch 56 is connected between second inverter 52 and second AC system 18 or between second inverter 52 and second propulsion system 18.

Electrical architecture 2 further comprises, in its non-propulsion portion 6, a third switch 64 connected between first AC system 46 and first junction box 62, and a fourth switch 66 connected between first junction box 62 and second AC system 54. When the first and second inverters are reversible, they can convert the three-phase AC voltage coming from auxiliary power unit 63 into DC voltage in order to supply it to the first and second propulsion systems during startup sequences, powerup sequences, or degraded modes.

Similarly, when the first and second inverters are reversible, they can convert the three-phase AC voltage coming from auxiliary power unit 63 into DC voltage in order to supply it to first 36 and second 42 batteries.

The invention claimed is:

1. An electrical architecture (2) for aircraft, comprising:
a first propulsion power distribution system (16) adapted to distribute a high DC (direct current) voltage,
a second propulsion power distribution system (18) adapted to distribute a high DC voltage,
a first AC (alternating current) power distribution system (46) adapted to distribute a three-phase AC voltage,
a second AC power distribution system (54) adapted to distribute a three-phase AC voltage,
a first inverter (44) connected between the first propulsion power distribution system (16) and the first AC power distribution system (46),
a second inverter (52) connected between the second propulsion power distribution system (18) and the second AC power distribution system (54), and
an electronics module (60), characterized in that the electronics module (60) is connected to the first inverter (44) and to the second inverter (52) in order to control a frequency of the three-phase AC voltage generated by the first inverter and a frequency of the three-phase AC voltage generated by the second inverter, the electronics module (60) being adapted to link a phase of the three-phase AC voltage generated by the second inverter (52) to a phase of the three-phase AC voltage generated by the first inverter (44).

2. An electrical architecture (2) according to claim 1, wherein the electronics module (60) is adapted to link synchronization signals for the three-phase AC voltage generated by the second inverter (52) to synchronization signals for the three-phase AC voltage generated by the first inverter (44).

3. An electrical architecture (2) according to claim 1, wherein the first inverter (44) and the second inverter (52) are controlled to generate the three-phase AC voltage that is output at a frequency of 400 Hertz.

4. An electrical architecture (2) according to claim 1, wherein at least one inverter among the first inverter (44) and second inverter (52) is a reversible inverter.

5. An electrical Electrical architecture (2) according to any one of claim 1, comprising:
 a first switch (48) adapted to connect the first propulsion power distribution system (16) to the first AC power distribution system (46);
 a second switch (56) adapted to connect the second propulsion power distribution system (18) to the second AC power distribution system (54); and
 at least a third switch (64, 66) adapted to connect the first AC power distribution system (46) to the second AC power distribution system (54).

6. An electrical architecture (2) according to claim 1, comprising a junction box (62) adapted to be connected to an auxiliary power unit, said junction box (62) being connected between the first AC power distribution system (46) and the second AC power distribution system (54).

7. An electrical architecture (2) according to claim 1, wherein the first propulsion power distribution system (16) further comprises a first battery (36) connected to the first inverter (44).

8. An electrical architecture (2) according to claim 1, comprising:
 a turbomachine having a low-pressure shaft (20) and a high-pressure shaft (22),
 a first low-pressure electric machine (8) coupled to the low-pressure shaft (20) of the turbomachine, and
 a first high-pressure electric machine (12) coupled to the high-pressure shaft (22) of the turbomachine, the first low-pressure electric machine (8) and the first high-pressure electric machine (12) being connected to the first propulsion power distribution system (16).

9. An electrical architecture (2) according to claim 8, further comprising a second low-pressure electric machine (10) coupled to the low-pressure shaft (20) of the turbomachine and a second high-pressure electric machine (14) coupled to the high-pressure shaft (22) of the turbomachine, the second low-pressure electric machine (10) and the second high-pressure electric machine (14) being connected to the second propulsion power distribution system (18).

10. An electrical architecture according to claim 8, wherein at least one low-pressure electric machine (8, 10) and at least one high-pressure electric machine (12, 14) are reversible electric motors.

* * * * *